United States Patent
Rivard et al.

(10) Patent No.: US 12,146,659 B2
(45) Date of Patent: *Nov. 19, 2024

(54) METHODS, SYSTEMS, AND DEVICES FOR FLUE GAS COOLING

(71) Applicant: NEXT CARBON SOLUTIONS, LLC, Houston, TX (US)

(72) Inventors: Connor Rivard, Houston, TX (US); Eunhwa Kim, Katy, TX (US); Sanjeev Agrawal, Sugar Land, TX (US); Alex Thompson, Sugar Land, TX (US); Ben Heichelbech, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/410,902

(22) Filed: Jan. 11, 2024

(65) Prior Publication Data

US 2024/0142102 A1    May 2, 2024

Related U.S. Application Data

(63) Continuation of application No. 18/144,656, filed on May 8, 2023.

(60) Provisional application No. 63/392,391, filed on Jul. 26, 2022.

(51) Int. Cl.
*F23J 15/06* (2006.01)
*B01D 53/14* (2006.01)
*F28C 3/08* (2006.01)

(52) U.S. Cl.
CPC .......... *F23J 15/06* (2013.01); *B01D 53/1475* (2013.01); *F28C 3/08* (2013.01); *B01D 2252/103* (2013.01); *B01D 2257/504* (2013.01); *B01D 2258/0283* (2013.01)

(58) Field of Classification Search
CPC .......... B01D 53/1475; B01D 2252/103; B01D 2257/504; B01D 2258/0283; F23J 15/06; F28C 3/08
See application file for complete search history.

(56) References Cited

U.S. PATENT DOCUMENTS

| | | | | |
|---|---|---|---|---|
| 7,194,869 B2* | 3/2007 | McQuiggan | ............ | F01D 25/32 62/304 |
| 7,390,353 B2* | 6/2008 | Deen | ........................ | F23J 15/06 110/215 |
| 2007/0101718 A1* | 5/2007 | Kravets | .................... | F01K 13/00 60/659 |
| 2010/0083831 A1* | 4/2010 | Gal | ........................ | B01D 53/62 95/232 |

(Continued)

*Primary Examiner* — Eric S Ruppert
*Assistant Examiner* — Hans R Weiland

(57) ABSTRACT

Devices, systems, and methods for flue gas cooling for carbon capture processes are disclosed herein. A flue gas cooling process for carbon capture includes: cooling a flue gas in a direct contact cooler by a cooling water cooled in a closed cooling loop; cooling the cooling water in the closed cooling loop utilizing air-cooled heat exchangers; cooling the flue gas below a water dew point to produce a surplus water when an available cooling duty of the closed cooling loop exceeds a cooling duty required to cool the flue stream to the water dew point; storing the surplus water in a surplus water storage vessel; and directing the surplus water stored in the surplus water storage vessel to the direct contact cooler when the available cooling duty of the closed cooling loop is less than the cooling duty required to cool the flue stream to the water dew point.

12 Claims, 3 Drawing Sheets

(56) References Cited

U.S. PATENT DOCUMENTS

| | | | |
|---|---|---|---|
| 2011/0067610 A1* | 3/2011 | Latimer | F23J 15/006 110/215 |
| 2011/0203311 A1* | 8/2011 | Wright | B01D 53/96 95/139 |

* cited by examiner

METHODS, SYSTEMS, AND DEVICES FOR FLUE GAS COOLING

CROSS REFERENCE TO RELATED APPLICATIONS

This application is a continuation of U.S. patent application Ser. No. 18/144,656, filed May 8, 2023, entitled METHODS, SYSTEMS, AND DEVICES FOR FLUE GAS COOLING, and claims the benefit of priority to U.S. Provisional Application No. 63/392,391 filed Jul. 26, 2022, the entirety of which is incorporated herein by reference.

BACKGROUND

In post-combustion carbon capture (PCC) facilities, carbon dioxide ($CO_2$) is separated from the flue gas via an absorbing media. $CO_2$ absorber columns in these units typically operate at temperature conditions in the range of 100° F. to 130° F. to enable effective absorption and to prevent accelerated degradation of the absorbing media which is exposed to oxygen and other contaminants in the flue gas.

The $CO_2$ laden flue gas streams from various industrial processes achieve post-combustion temperatures ranging from 150° F. to 1500° F. These streams must be cooled prior to contact with the absorbing media in the $CO_2$ absorber. Flue gas streams are typically cooled using a combination of heat recovery either for power generation or cogeneration followed by a direct contact cooling process which utilizes a cooling water loop. Cooling water systems can be costly and can require significant amounts of fresh-water make-up, placing a significant demand on utilities and local fresh-water sources.

FIG. 1 illustrates a prior art cooling process of a post-combustion flue gas stream 101 using heat recovery 100 for power generation or cogeneration, followed by a direct contact cooler process 120 plus a freshwater cooling loop cooled using an evaporative cooling process 150. An evaporative cooling water process 150 can be costly and typically requires large amounts of fresh-water make-up 153, which can place a significant demand on local utilities and fresh-water sources.

Combustion flue gas 101 from various combustion processes can achieve post-combustion temperatures ranging from 150° F. to 1500° F. The flue gas is primarily composed of a mixture of nitrogen, oxygen, carbon-dioxide, and water. The flue gas can include additional products of combustion, such as $SO_x$ and $NO_x$, which are general representations of sulfur and nitrogen oxides, respectively. The presence and levels of additional contaminants in the flue gas (e.g. sulfur, chlorine, bromine, etc.) can depend on the relative levels of those contaminants in the fuel source. Flue gases may also contain particulate matter.

A heat recovery process 100 is typically utilized for power generation or for process heating requirements. Heat recovery processes 100 typically reduce flue gas temperatures to a range of 300° F. to 150° F.

A direct contact cooler (DCC) 120 utilizes a quenching process in which quench water is mixed directly into the flue gas stream to provide rapid heat transfer. The hot quench water from the bottom of the DCC is cooled by an external cooling loop, typically in the form of a fresh-water cooling loop with evaporative cooling 150. The cooled quench water is then circulated back the top of the DCC.

Cooling water is utilized to cool the quench water used in the DCC 120, typically via a liquid-to-liquid exchanger or quench water cooler 140. Heated cooling water 152 from this exchanger 140 is sent to an evaporative cooling process 150, where a portion of the water evaporates. The evaporative process allows the cooling water to be cooled to near the wet-bulb temperature of the ambient air, and the cooled water 151 is pumped back to cool the quench water. Additional cooling water is rejected from the evaporative cooling process 150 as blowdown water 154. The rate of blowdown is used to control the concentration of contaminants in the cooling water system.

Fresh-water make-up 153 is provided to the evaporative cooling process 150 to replenish the water losses from evaporation and blowdown. Fresh-water make-up requirements can be cost prohibitive or unavailable based on the local availability of fresh-water.

SUMMARY

In PCC facilities, flue gas streams are often required to be cooled to meet the process temperature requirements of the selected $CO_2$ absorption technology. The standard cooling process in PCC facilities involves the use of a direct contact cooler (DCC). In a DCC, hot flue gasses come into direct contact with quenching water in a counter-flow configuration, and the flue gas may be cooled to the desired temperature. The cooled flue gas stream leaving the DCC may be saturated with water. The quenching water may be warmed as it removes heat from the flue gas in the DCC. The warmed quenching water typically exchanges heat with a separate cooling water loop that rejects heat via evaporative cooling.

PCC facilities with limited water resources may utilize air-cooled heat exchangers (ACHEs) in lieu of evaporative cooling technologies (e.g. cooling towers) to cool the quenching water for the DCC. For a process with stable quench water conditions (i.e. consistent flow and temperature), the available cooling duty of the quench water ACHE may vary due to fluctuations in ambient temperature ($T_a$). The available cooling duty of the quench water ACHE may be higher when ambient temperatures are lower, and the available cooling duty of the quench water ACHE may be lower when the ambient temperature is higher. Variations in the quench water ACHE cooling duty are typically managed by adjusting other process parameters (e.g. adjusting flow through the ACHE by implementing a bypass line with temperature control).

All post-combustion flue gas streams contain water. The water present in the flue gas streams may be both a product of combustion and/or a component of the combustion air. The temperature at which water will condense from the flue gas is the water dew point temperature ($T_s$). $T_s$ is primarily a function of the relative amount of water contained in the flue stream. $T_s$ is higher for streams that have more water and lower for streams that have less water.

To maintain the amount of liquid water in the DCC, the flue gas streams can be cooled to $T_s$. If the flue gas is cooled below $T_s$, water may condense and accumulate in the DCC. If the flue gas is cooled to a temperature above $T_s$, the some quenching water may evaporate and saturate the flue gas stream. In the latter case, water must be continuously supplied to offset the evaporative losses and maintain the liquid level in the DCC. In some instances, quenching water may be required to be blown down from the DCC to offset the accumulation of impurities in the quenching water.

The cooling process can be optimized to utilize higher available ACHE duties while low ambient temperatures persist (e.g. night time) to offset lower available ACHE duties while high ambient temperatures persist (e.g. day time). When a higher ACHE duty is available, the flue gas can be cooled to some temperature below $T_s$ to condense water. The condensed water can be stored and utilized as make-up water to the DCC when a lower ACHE duty is available due to high ambient temperatures.

Using a higher ACHE cooling duty to condense and store condensate beneficially minimizes or eliminates the requirement for external make-up water to the DCC. Additionally, instead of increasing the surface area of ACHEs to cover a wider range of ambient conditions, the storage and re-use of condensate mitigates the impact of warm periods, potentially allowing for the ACHE to be designed for a narrower band of ambient conditions. The stored condensate can also be beneficially used for to minimize or eliminate the external make-up water requirement for other water consumers within the PCC or for external users.

In light of the disclosure set forth herein, and without limiting the disclosure in any way, in a first aspect, which may be combined with any other aspect or portion thereof described herein, a flue gas cooling process includes cooling a flue gas in a direct contact cooler with a circulated water cooled in a closed cooling loop; cooling the circulated water in the closed cooling loop utilizing air-cooled heat exchangers; cooling the flue gas below a water dew point to produce a surplus water when an available cooling duty of the closed cooling loop exceeds a cooling duty required to cool the flue stream to the water dew point; storing the surplus water in a surplus water storage vessel; and utilizing the surplus water stored in the surplus water storage vessel in the direct contact cooler when the available cooling duty of the closed cooling loop is less than the cooling duty required to cool the flue stream to the water dew point.

In a second aspect, which may be combined with any other aspect or portion thereof described herein unless otherwise specified, the flue gas cooling process further includes directing a further portion of the surplus water to a user in a carbon capture process.

In a third aspect, which may be combined with any other aspect or portion thereof described herein unless otherwise specified, the flue gas cooling process further includes directing a further portion of the surplus water to at least one external water consumer.

In a fourth aspect, which may be combined with any other aspect or portion thereof described herein unless otherwise specified, the flue gas cooling process further includes receiving, by the surplus water storage vessel, an external water supply.

In a fifth aspect, which may be combined with any other aspect or portion thereof described herein unless otherwise specified, the flue gas cooling process further includes cooling, by a chilling unit, the circulated water cooled in the closed cooling loop to increase an amount of the surplus water produced.

In a sixth aspect, which may be combined with any other aspect or portion thereof described herein unless otherwise specified, the surplus water storage vessel is part of the direct contact cooler.

In a seventh aspect, which may be combined with any other aspect or portion thereof described herein unless otherwise specified, the surplus water storage vessel is external to the direct contact cooler.

In an eighth aspect, which may be combined with any other aspect or portion thereof described herein unless otherwise specified, a flue gas cooling process includes cooling a flue gas in a direct contact cooler with a circulated water cooled in a closed cooling loop; cooling the circulated water in the closed cooling loop utilizing air-cooled heat exchangers; cooling the flue gas below a water dew point to produce a surplus water when an available cooling duty of the closed cooling loop exceeds a cooling duty required to cool the flue stream to the water dew point; storing the surplus water in a surplus water storage vessel; and directing the surplus water stored in the surplus water storage vessel to a user within a carbon capture facility.

In a ninth aspect, which may be combined with any other aspect or portion thereof described herein unless otherwise specified, the flue gas cooling process further includes directing a portion of the surplus water stored in the surplus water storage vessel to the direct contact cooler when the available cooling duty of the closed cooling loop is less than the cooling duty required to cool the flue stream to the water dew point.

In a tenth aspect, which may be combined with any other aspect or portion thereof described herein unless otherwise specified, a flue gas cooling process includes cooling a flue gas in a direct contact cooler with a circulated water cooled in a closed cooling loop; cooling the circulated water in the closed cooling loop utilizing air-cooled heat exchangers; cooling the flue gas below a water dew point to produce a surplus water when an available cooling duty of the closed cooling loop exceeds a cooling duty required to cool the flue stream to the water dew point; storing the surplus water in a surplus water storage vessel; and directing the surplus water to at least one water consumer external to a carbon capture facility.

In an eleventh aspect, which may be combined with any other aspect or portion thereof described herein unless otherwise specified, a flue gas cooling process includes cooling a flue gas in a direct contact cooler with a circulated water cooled in a closed cooling loop, wherein the cooling of the flue gas produces a surplus water; and cooling the circulated water in the closed cooling loop utilizing air-cooled heat exchangers.

In a twelfth aspect, any of the features, functionalities, and alternatives described in connection with either of FIG. 2 or 3 may be combined with any of the features, functionalities, and alternatives described in connection with the other of FIG. 2 or 3.

Additional features and advantages of the disclosed devices, systems, and methods are described in and will be apparent from the following Detailed Description and the Figures. The features and advantages described herein are not all-inclusive and in particular many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

DETAILED DESCRIPTION

The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. To the extent that any term is referred to in a manner consistent with a single meaning, that is done for the sake of clarity and illustration only, and it is not intended that such claim term be limited to that single meaning.

The present disclosure provides novel processes, apparatuses, and systems that can be used individually or in combination to optimize utility costs associated with the cooling of post-combustion flue gas. While the embodiments shown in FIGS. 2 and 3 and described herein are directed to a flue gas cooling process used in a carbon capture facility, the cooling processes described herein may be used to cool any condensable component in a cooled gas stream in any type of facility, including but not limited to carbon capture facilities.

Figure 1:
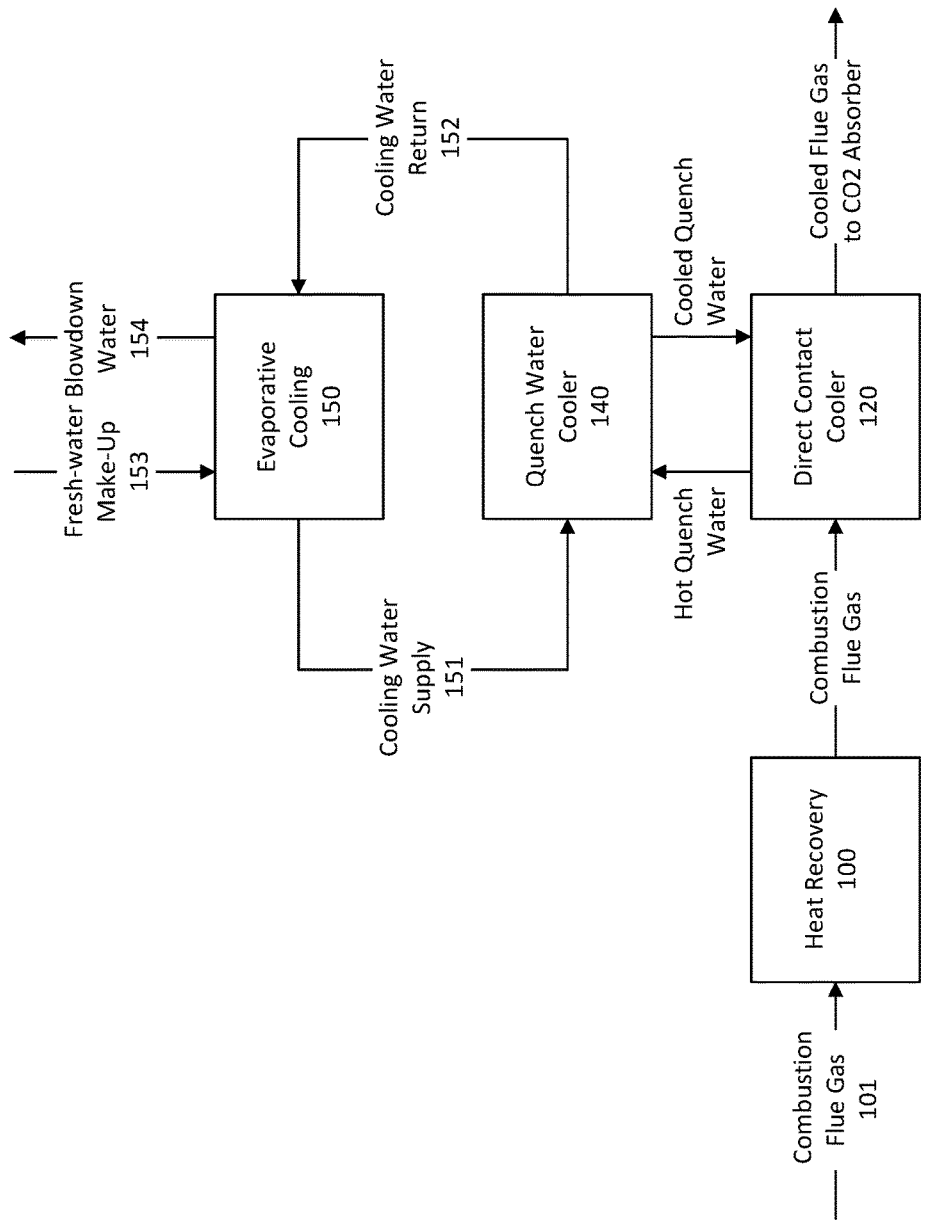
FIG. 1 illustrates prior art flue gas cooling processes for $CO_2$ capture.
Figure 2:
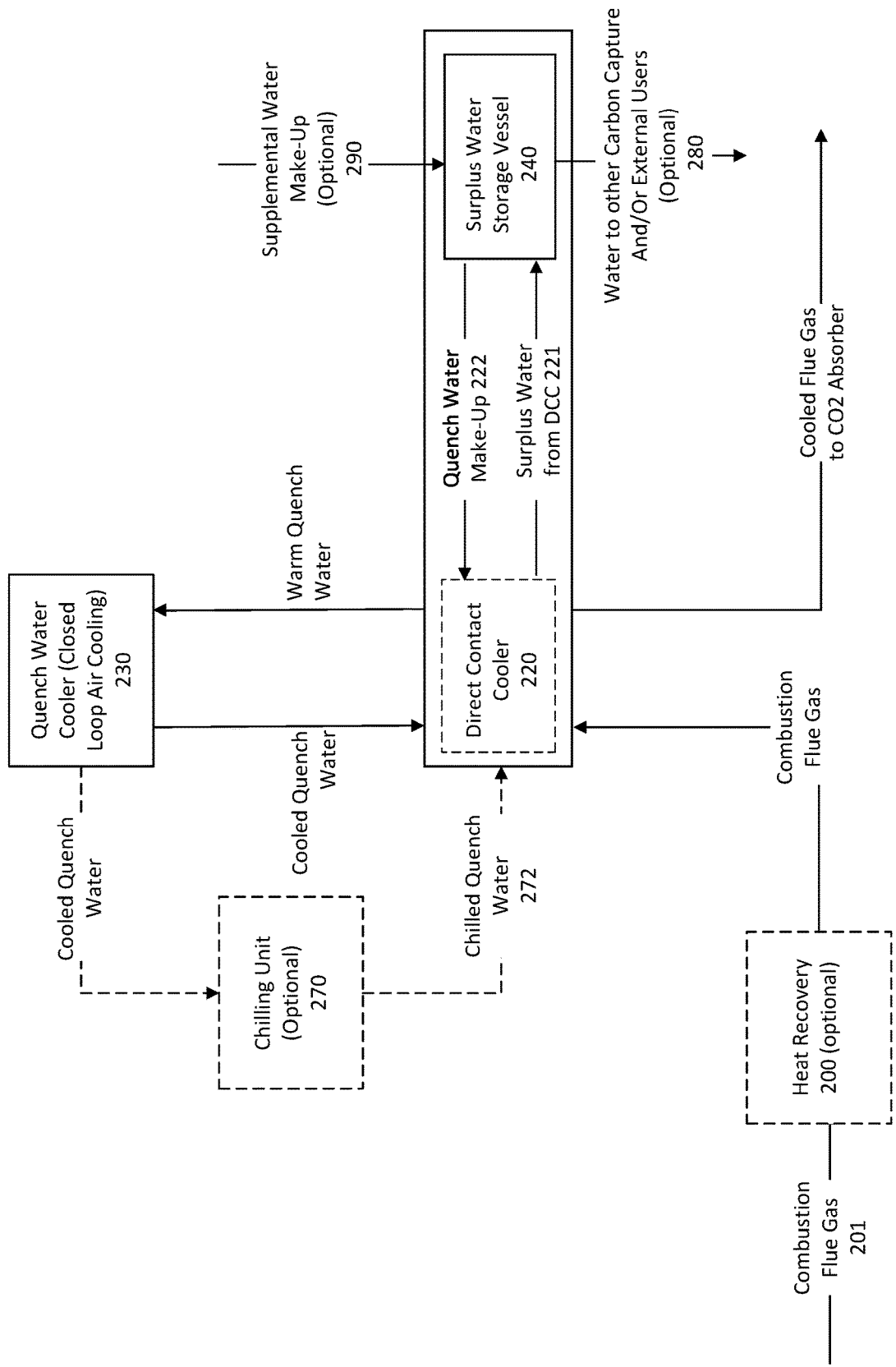
FIG. 2 illustrates a flue gas cooling process that includes process optimizations according to an aspect of the present disclosure.
Figure 3:
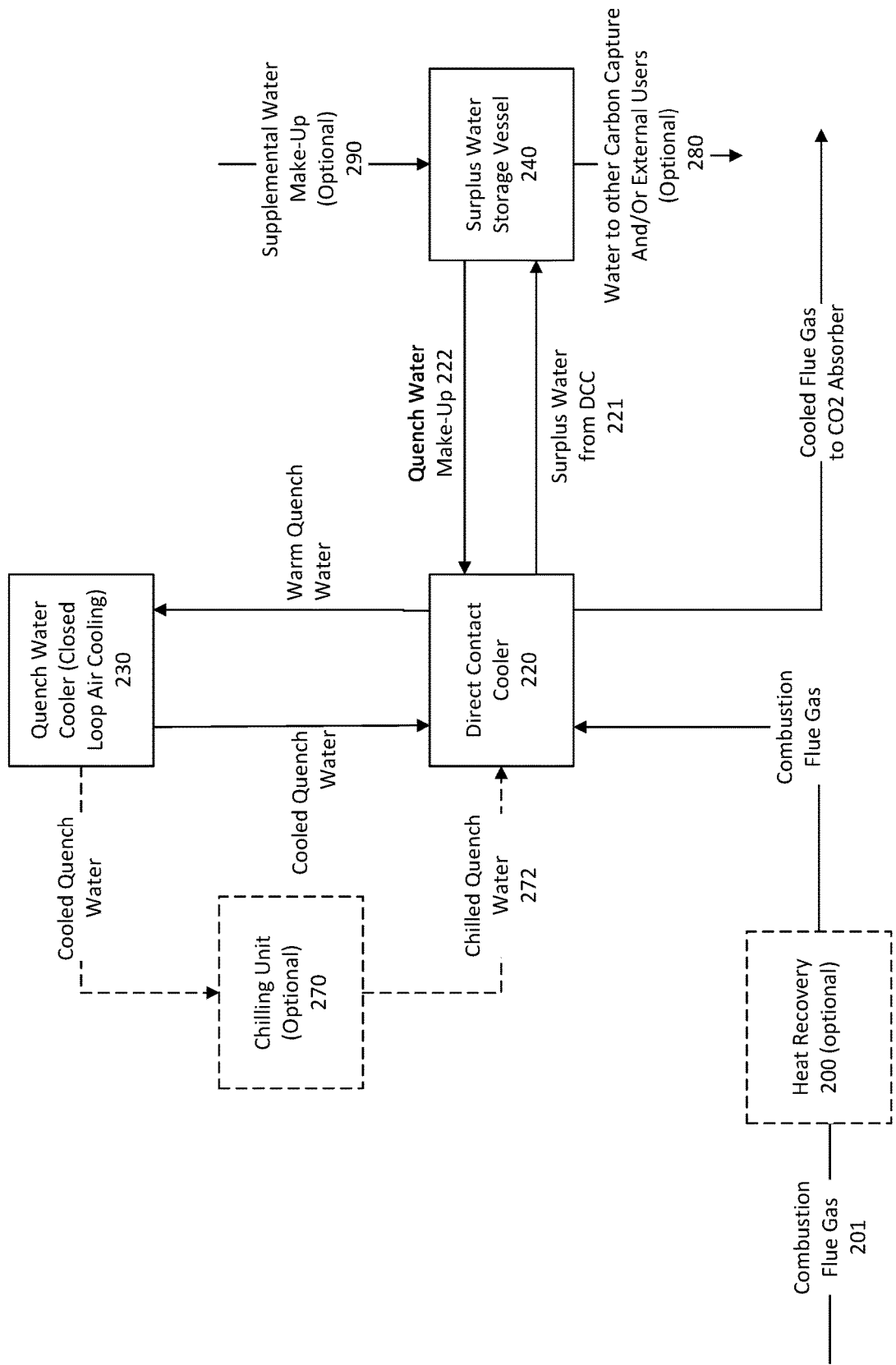
FIG. 3 illustrates a further embodiment of a flue gas cooling process that includes process optimizations according to another aspect of the present disclosure.

In some non-limiting embodiments, as shown in FIGS. 2 and 3, a quench water cooler 230 using closed loop air cooling may utilize air-cooled heat exchangers (ACHE) 230 that may use ambient air to cool the quench water and the cooled quench water may then return to the direct contact cooler (DCC) 220. The DCC 220 shown in FIGS. 2 and 3 may have the same function as the DCC 120. Post-combustion flue gas 201 is typically about 7-20% water by volume, which will result in condensed water when the combustion flue gas 201 is cooled below its water dew point. The non-limiting embodiments shown in FIGS. 2 and 3 do not negatively impact the performance of the absorber (not shown).

The quench water cooler 230 may have a higher available cooling duty when the ambient temperature is low (e.g. night time). The quench water cooler may have a lower available cooling duty when the ambient temperature is high (e.g. day time). Advantageously, the higher available cooling duty in quench water cooler 230 can be utilized to cool the flue gas below a dew point thereof and condense water from the flue gas stream resulting in a surplus of water 221 in the DCC 220. The surplus water 221 in the DCC 220 can be stored in a surplus water storage vessel 240. In the embodiment shown in FIG. 2, the surplus water storage vessel 240 is housed within and/or is a part of the DCC 220. In other embodiments such as the embodiment of FIG. 3, the surplus water storage vessel 240 is separate from an additional storage volume of the DCC 220 into which a portion of the surplus water 221 may be directed.

All or part of the water from 240 can be sent to the DCC 220 as quench water make-up water 222 to offset water losses in the DCC 220. Water losses in the DCC 220 may occur if the lower available cooling duty in the quench water cooler 230 is insufficient to cool the flue gas to its water dew point. Water may evaporate in the DCC 220 and saturate the flue gas. One advantage is that the quench water make-up 222 allows for evaporation in the DCC 220 while maintaining the amount of quench water in the system. A second advantage is that allowing for evaporation in the DCC 220 provides evaporative cooling (latent heat transfer) in the DCC 220 which reduces the required cooling duty of the quench water cooler 230. The combination of evaporative cooling in the DCC 220 and cooling in the quench water cooler 230 may extend the range of ambient temperatures over which sufficient cooling can be provided to the flue gas to meet downstream process requirements without the requirement of external water make-up.

If external water is available, a supplemental water make-up 290 can be an optional source of make-up water 222.

Additionally or optionally, surplus water 221 or a portion thereof in the surplus water storage vessel 240 can be sent to other users within the carbon capture facility or to water users external to the carbon capture facility 280.

For processes in which the flue gas stream must be cooled to temperatures lower than what can practically achieved with an air cooling process, an optional chilling unit 270 can added downstream of the quench water cooler 230 to chill the quench water 271 from the quench water cooler 230. After the quench water is chilled to a temperature lower than the quench water exiting the quench water cooler 230, it is supplied as the chilled quench water 272 to the direct contact cooler 220 where it is used to quench the flue gas. The chiller 270 can provide additional cooling duty and thus produce an increased amount of surplus water 221, which then could be used in other carbon capture or external users 280.

As used in this disclosure and the appended claims, the singular forms "a," "an" and "the" include plural referents unless the context clearly dictates otherwise. Thus, for example, reference to "an ingredient or "the ingredient" means "at least one ingredient" and includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. A composition "consisting essentially of" contains at least 75 wt. % of the referenced components, preferably at least 85 wt. % of the referenced components, more preferably at least 95 wt. % of the referenced components, most preferably at least 98 wt. % of the referenced components.

The terms "at least one of" and "and/or" used in the respective context of "at least one of X or Y" and "X and/or Y" should be interpreted as "X," or "Y," or "X and Y." For example, "at least one of honey or chicory root syrup" should be interpreted as "honey without chicory root syrup," or "chicory root syrup without honey," or "both honey and chicory root syrup."

Where used herein, the terms "example" and "such as," particularly when followed by a listing of terms, are merely exemplary and illustrative and should not be deemed to be exclusive or comprehensive. The many features and advantages of the present disclosure are apparent from the written description, and thus, the appended claims are intended to cover all such features and advantages of disclosure. Further, since numerous modification and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable no or in the future.

This invention is claimed as follows:
1. A flue gas cooling process comprising:
  cooling a flue gas in a direct contact cooler with a circulated water cooled in a closed cooling loop;
  cooling the circulated water in the closed cooling loop utilizing air-cooled heat exchangers;

cooling the flue gas below a water dew point to produce a surplus water when an available cooling duty of the closed cooling loop exceeds a cooling duty required to cool the flue stream to the water dew point; and utilizing the surplus water in the direct contact cooler when the available cooling duty of the closed cooling loop is less than the cooling duty required to cool the flue stream to the water dew point.

2. The flue gas cooling process of claim 1, further comprising directing a further portion of the surplus water to a user in a carbon capture process.

3. The flue gas cooling process of claim 1, further comprising directing a further portion of the surplus water to at least one external water consumer.

4. The flue gas cooling process of claim 1, further comprising cooling, by a chilling unit, the circulated water cooled in the closed cooling loop to increase an amount of the surplus water produced.

5. A flue gas cooling process comprising:
cooling a flue gas in a direct contact cooler with a circulated water cooled in a closed cooling loop;
cooling the circulated water in the closed cooling loop utilizing air-cooled heat exchangers;
cooling the flue gas below a water dew point to produce a surplus water when an available cooling duty of the closed cooling loop exceeds a cooling duty required to cool the flue stream to the water dew point; and
directing the surplus water to a user within a separate carbon capture facility.

6. The flue gas cooling process of claim 5, further comprising directing a portion of the surplus water to the direct contact cooler when the available cooling duty of the closed cooling loop is less than the cooling duty required to cool the flue stream to the water dew point.

7. The flue gas cooling process of claim 5, further comprising directing a portion of the surplus water to at least one external water consumer.

8. The flue gas cooling process of claim 5, further comprising cooling, by a chilling unit, the circulated water cooled in the closed cooling loop to increase an amount of the surplus water produced.

9. A flue gas cooling process comprising:
cooling a flue gas in a direct contact cooler with a circulated water cooled in a closed cooling loop;
cooling the circulated water in the closed cooling loop utilizing air-cooled heat exchangers;
cooling the flue gas below a water dew point to produce a surplus water when an available cooling duty of the closed cooling loop exceeds a cooling duty required to cool the flue stream to the water dew point; and
directing the surplus water to at least one water consumer external to a carbon capture facility.

10. The flue gas cooling process of claim 9 further comprising directing a portion of the surplus water to a user within a carbon capture facility.

11. The flue gas cooling process of claim 9 further comprising directing a portion of the surplus water to the direct contact cooler when the available cooling duty of the closed cooling loop is less than the cooling duty required to cool the flue stream to the water dew point.

12. The flue gas cooling process of claim 9 further comprising cooling, by a chilling unit, the circulated water cooled to the closed cooling loop to increase an amount of the surplus water produced.

\* \* \* \* \*